United States Patent
Lafitte et al.

(10) Patent No.: US 9,290,689 B2
(45) Date of Patent: Mar. 22, 2016

(54) USE OF ENCAPSULATED TRACERS

(75) Inventors: Valerie Lafitte, Cambridge (GB);
Trevor Hughes, Cambridge (GB);
Slaheddine Kefi, Velizy Villacoublay (FR); Matthew Miller, Cambridge (GB); Gary Tustin, Sawston (GB); Shiyi Wang, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 1089 days.

(21) Appl. No.: 12/477,502

(22) Filed: Jun. 3, 2009

(65) Prior Publication Data

US 2010/0307745 A1  Dec. 9, 2010

(51) Int. Cl.
*E21B 43/26* (2006.01)
*C09K 8/62* (2006.01)
*E21B 47/10* (2012.01)

(52) U.S. Cl.
CPC . *C09K 8/62* (2013.01); *E21B 43/26* (2013.01); *E21B 47/1015* (2013.01)

(58) Field of Classification Search
CPC .............................. E21B 43/26; E21B 47/1005
USPC ............. 166/280.1, 280.2, 250.1, 252.6, 271, 166/269, 275, 280
See application file for complete search history.

(56) References Cited

U.S. PATENT DOCUMENTS

| | | | |
|---|---|---|---|
| 3,796,883 A | 3/1974 | Smith et al. | |
| 3,987,850 A | 10/1976 | Fitch | |
| 4,008,763 A | 2/1977 | Lowe, Jr. | |
| 4,264,329 A | 4/1981 | Beckett | |

(Continued)

FOREIGN PATENT DOCUMENTS

| | | |
|---|---|---|
| EP | 1259700 B1 | 5/2007 |
| GB | 2434165 A | 7/2007 |

(Continued)

OTHER PUBLICATIONS

Allen: "Particle size measurement", 4th edition, Chapman and Hall, London, 1990, pp. 124-156, 715-718.

(Continued)

*Primary Examiner* — Doug Hutton, Jr.
*Assistant Examiner* — Silvana Runyan

(57) ABSTRACT

A process of making observations of a subterranean reservoir penetrated by a wellbore uses distinguishable sets of tracer particles and comprises steps of:

(i) delivering a plurality of sets of tracer particles to respective subterranean locations via the wellbore, the particles in each set comprising a tracer substance which distinguishes that set form the other sets;

(ii) causing or allowing the tracer substances to flow out from the tracer particles whilst the particles are at the respective subterranean locations;

(iii) causing or allowing production of fluid out of said reservoir via the wellbore; and (iv) detecting the presence or absence of the tracer substances in the produced fluid.

The tracer substances are sufficiently distinguishable from each other to enable a tracer substance detected in the produced fluid to identify the set of tracer particles from which it has come and hence identify the location from which it has come. The process may be used in conjunction with hydraulic fracturing, placing sets of particles at different locations within a fracture and/or in different fractures extending from a single wellbore.

19 Claims, 2 Drawing Sheets

(56) References Cited

U.S. PATENT DOCUMENTS

| | | | |
|---|---|---|---|
| 4,506,734 A | 3/1985 | Nolte | |
| 4,614,599 A | 9/1986 | Walker | |
| 4,919,209 A | 4/1990 | King | |
| 4,986,354 A | 1/1991 | Cantu et al. | |
| 5,110,486 A | 5/1992 | Manalastas et al. | |
| 5,238,065 A | 8/1993 | Mondshine et al. | |
| 5,253,711 A | 10/1993 | Mondshine | |
| 5,437,331 A | 8/1995 | Gupta et al. | |
| 5,478,564 A | 12/1995 | Wantier et al. | |
| 5,518,996 A * | 5/1996 | Maroy et al. | 507/100 |
| 5,613,558 A | 3/1997 | Dilenbeck, III | |
| 5,624,886 A | 4/1997 | Dawson et al. | |
| 5,658,861 A | 8/1997 | Nelson et al. | |
| 5,892,147 A * | 4/1999 | Garnes et al. | 73/152.14 |
| 5,922,652 A | 7/1999 | Kowalski et al. | |
| 5,929,437 A * | 7/1999 | Elliott et al. | 250/259 |
| 6,192,985 B1 | 2/2001 | Hinkel et al. | |
| 6,280,495 B1 | 8/2001 | Doetsch et al. | |
| 6,326,335 B1 | 12/2001 | Kowalski et al. | |
| 6,380,136 B1 * | 4/2002 | Bates et al. | 507/90 |
| 6,444,316 B1 | 9/2002 | Reddy et al. | |
| 6,527,051 B1 | 3/2003 | Reddy et al. | |
| 6,554,071 B1 | 4/2003 | Reddy et al. | |
| 6,645,769 B2 * | 11/2003 | Tayebi et al. | 436/56 |
| 6,659,175 B2 | 12/2003 | Malone et al. | |
| 6,723,683 B2 | 4/2004 | Crossman et al. | |
| 6,764,980 B2 * | 7/2004 | Bates et al. | 507/90 |
| 6,799,634 B2 | 10/2004 | Hartog et al. | |
| 6,818,594 B1 | 11/2004 | Freeman et al. | |
| 6,840,318 B2 | 1/2005 | Lee et al. | |
| 6,861,394 B2 | 3/2005 | Ballard et al. | |
| 6,881,709 B2 | 4/2005 | Nelson et al. | |
| 6,908,888 B2 | 6/2005 | Lee et al. | |
| 7,032,662 B2 * | 4/2006 | Malone et al. | 166/252.6 |
| 7,049,272 B2 | 5/2006 | Sinclair et al. | |
| 7,066,260 B2 | 6/2006 | Sullivan et al. | |
| 7,081,211 B2 | 7/2006 | Li et al. | |
| 7,096,947 B2 | 8/2006 | Todd et al. | |
| 7,166,560 B2 | 1/2007 | Still et al. | |
| 7,204,312 B2 | 4/2007 | Ruddy et al. | |
| 7,219,731 B2 | 5/2007 | Sullivan et al. | |
| 7,265,079 B2 | 9/2007 | Willberg et al. | |
| 7,275,596 B2 | 10/2007 | Willberg et al. | |
| 7,287,590 B1 | 10/2007 | Sullivan et al. | |
| 7,347,260 B2 | 3/2008 | Ferguson et al. | |
| 7,560,690 B2 | 7/2009 | Stray et al. | |
| 7,703,521 B2 * | 4/2010 | Sullivan et al. | 166/279 |
| 7,748,452 B2 * | 7/2010 | Sullivan et al. | 166/279 |
| 2003/0196799 A1 | 10/2003 | Nguyen et al. | |
| 2004/0014607 A1 | 1/2004 | Sinclair et al. | |
| 2004/0112255 A1 * | 6/2004 | Bruno et al. | 106/672 |
| 2004/0115378 A1 | 6/2004 | Dunaway et al. | |
| 2005/0000690 A1 * | 1/2005 | Boney | 166/280.2 |
| 2006/0166838 A1 | 7/2006 | Collins et al. | |
| 2007/0214878 A1 | 9/2007 | Anderson | |
| 2008/0287325 A1 * | 11/2008 | Thompson et al. | 507/273 |

FOREIGN PATENT DOCUMENTS

| | | |
|---|---|---|
| WO | 9322537 A1 | 11/1993 |
| WO | 0103676 A1 | 1/2001 |
| WO | 0212674 A1 | 2/2002 |
| WO | 03054109 A1 | 7/2003 |
| WO | 03106809 A1 | 12/2003 |
| WO | 2005095538 A1 | 10/2005 |
| WO | 2005095755 A1 | 10/2005 |
| WO | 20060004426 A1 | 1/2006 |
| WO | 2006047478 A2 | 5/2006 |
| WO | 2007132137 A1 | 11/2007 |

OTHER PUBLICATIONS

Anderson et al: "Biodegradation and biocompatibility of PLA and PLGA microspheres", Advanced Drug Delivery Reviews, vol. 28, issue 1, 1997, pp. 5-24.

Ayoub et al: "New findings in fracture cleanup change common industry perception", Society of Petroleum Engineers 2006 international Symposium and Exhibition on Formation Damage Control, Lafayette, LA, Feb. 15-17, 2006, SPE98746.

Ayoub et al: "New results improve fracture cleanup characterization and damage mitigatio", Society of Petroleum Engineers 2006 Annual Technical Conference and Exhibition, San Antonio, Texas Sep. 24-27, 2006, SPE102326.

Blanco et al: "Degradation behaviour of microspheres prepared by spray-drying poly(D,L-lactide) and poly(D,L-lactide-co-glycolide) polymers", International Journal of Pharmaceutics, vol. 326, issues 1-2, 2006, pp. 139-147.

Blanco-Príeto et al: "Importance of single or blended polymer types for controlled in vitro release and plasma levels of a somatostatin analogue entrapped in PLA/PLGA microspheres", Journal of Controlled Release, vol. 96, issue 3, 2004, pp. 437-448.

Cleland: "Solvent evaporation processes for the production of controlled release biodegradable microsphere formulations for therapeutics and vaccines", Biotechnol. Prog., vol. 14, 1998, pp. 102-107.

Collins et al: "The development of a revolutionary scale-control product for the control of near-well bore sulfate scale within production wells by the treatment of injection seawater", Society of Petroleum Engineers 2006 Oilfield Scale Symposium, Aberdeen May 31-Jun. 1, 2006, SPE100357.

Crews: "Internal phase breaker technology for viscoelastic surfactant gelled fluids", Society of Petroleum Engineers 2005 International Symposium on Oilfield Chemistry, Houston, Texas, Feb. 2-4, 2005, SPE 93449.

Freiberg et al: "Polymer microspheres for controlled drug release", International Journal of Pharmaceutics, vol. 282, issues 1-2, 2004, pp. 1-18.

Freitas et al: "Microencapsulation by solvent extraction/evaporation: reviewing the state of the art microsphere preparation process technology", Journal of Controlled Release, vol. 102, issue 2, 2005, pp. 313-332.

Gardien et al: "Hydraulic fracture diagnosis using chemical tracers", Society of Petroleum Engineers 1996 Annual Technical Conference and Exhibition, Denver, Colorado, Oct. 6-9, 1996, SPE 36675.

Guibis et al: "Encapsulated breaker for aqueous polymeric fluids", Society of Petroleum Engineers, SPE19433, 1992, pp. 9-14.

Haider et al: "Genetically engineered polymers: status and prospects for controlled release", Journal of Controlled Release, vol. 95, issue 1, 2004, pp. 1-26.

Holland et al: "Polymers for biodegradable medical devices. 1. The potential of polyesters as controlled macromolecular release systems", Journal of Controlled Release, vol. 4, issue 3, 1986, pp. 155-180.

Jain: "The manufacturing techniques of various drug loaded biodegradable poly(lactide-co-glycolide) (PLGA) devices", Biomaterials, vol. 21, No. 23, 2000, pp. 2475-2490.

Jeong et al, "Biodegradable block copolymers as injectable drug-delivery systems", Nature, vol. 388, Aug. 1997, pp. 860-862.

Lee et al: "Double-walled microspheres for the sustained release of a highly water-soluble drug: characterization and irradiation studies", Journal of Controlled Release, vol. 83, issue 3, 2002, pp. 437-452.

Lin et al: "Effects of hydroxyapatite dosage on mechanical and biological behaviors of polylactic acid composite materials", Materials Letters, vol. 61, issues 14-15, 2007, pp. 3009-3013.

Lunt: "Large-scale production, properties and commercial applications of polylactic acid polymers", Polymer Degradation and Stability, vol. 59, 1998, pp. 145-152.

McDaniel et al: "A new environmentally acceptable technique for determination of propped fracture height and width", Society of Petroleum Engineers 2007 Annual Technical Conference and Exhibition, Anaheim, California, Nov. 11-14, 2007, SPE109969.

Okada: "Chemical syntheses of biodegradable polymers", Prog. Polym. Sci., vol. 27, 2002, pp. 87-133.

Oksman et al: "Natural fibres as reinforcement in polylactic acid (PLA) composites", Composites Science and Technology, vol. 63, issue 9, 2003, pp. 1317-1324.

Pandey et al: "Fracture stimulation utilizing a viscoelastic-surfactant-based system in the Morrow Sands in Southeast New

(56) References Cited

OTHER PUBLICATIONS

Mexico", Society of Petroleum Engineers 2007 International Symposium on Oilfield Chemistry, Houston, Texas, Feb. 28-Mar. 2, 2007, SPE102677.

Park: "Degradation of poly(lactic-co-glycolic acid) microspheres: effect of copolymer composition", Biomaterials, vol. 16, No. 15, 1995, pp. 1123-1130.

Rawle: "Basic principles of particle size analysis", Technical Paper, Malvern Instruments Ltd, Malvern, United Kingdom, Application note: MRK034 (www.malvern.co.uk), pp. 1-8.

Robinson Brothers Ltd: "Additives for biodegradable polylactic acid compounds", Additives for Polymers, Jul. 2003, p. 3.

Shogren et al: "Biodegradation of starch/polylactic acid/poly(hydroxyester-ether) composite bars in soil", Polymer Degradation and Stability, vol. 79, issue 3, 2003, pp. 405-411.

Silveira et al: "Susceptibility of cobalt ferrite nanoparticles dispersed in polylactic acid microspheres", Journal of Magnetism and Magnetic Materials, vol. 272-276, 2004, pp. e1195-e1196.

Sodergard et al, "Properties of lactic acid based polymers and their correlation with composition", Progr. Polym. Sci., vol. 27, 2002, pp. 1123-1163.

Solvay: "IXPER 75C Calcium peroxide: dough conditioner. Application data sheet", Solvay Chemicals, IXP-03-002, www.solvaychemicals.us, 2004, pp. 1-5.

Sudesh et al: "Synthesis, structure and properties of polyhydroxyalkanoates: biological polyesters", Progress in Polymer Science, vol. 25, No. 10, 2000, pp. 1503-1555.

Suriyamongkol et al: "Biotechnological approaches for the production of polyhydroxyalkanoates in microorganisms and plants—A review", Biotechnology Advances, vol. 25, issue 2, 2007, pp. 148-175.

Uhrich et al: "Polymeric systems for controlled drug release", Chemical Reviews, vol. 99, No. 11, 1999, pp. 3181-3198.

Search Report of PCT Application Serial No. PCT/IB2010/001087 dated Jan. 10, 2011.

\* cited by examiner

USE OF ENCAPSULATED TRACERS

FIELD OF THE INVENTION

This invention relates to the utilization of tracers within subterranean reservoirs. It is particularly concerned with their use in association with stimulation of a hydrocarbon reservoir, notably by hydraulic fracturing.

BACKGROUND OF THE INVENTION

The use of tracers to obtain information about an oil reservoir and/or about what is taking place therein has been practiced for several decades and has been described in numerous documents. Primarily tracers have been used to monitor fluid paths and velocities. More than one tracer substance may be used concurrently. For instance U.S. Pat. No. 5,892,147 discloses a procedure in which a plurality of different tracer substances are placed at respective locations along the length of a well penetrating a reservoir. The tracer substances are placed at these locations during completion of the well before production begins. The tracer at each location is either attached to a section of pipe before it is placed at that location or is delivered into the location whilst perforating casing at that location. When production begins, monitoring the proportions of the individual tracers in the oil or gas produced by the well permits calculation of the proportions of oil or gas being produced from different zones of the reservoir.

Distinctive chemicals which can be detected in high dilution, such as fluorocarbons, dyes or fluorescers have been used as tracers. Genetically coded material has been proposed (and WO2007/132137 gives a method for detection of biological tags). Radio-isotopes have frequently been used as tracers. Society of Petroleum Engineers paper SPE109,969 discloses the use of materials which can be activated to become short lived radio-isotopes.

Hydraulic fracturing is a well established technique for stimulating production from a hydrocarbon reservoir. Typically a thickened, viscous fracturing fluid is pumped into the reservoir formation through a wellbore and fractures the formation. Thickened fluid is then also used to carry a particulate proppant into the fracture. The fracturing fluid is subsequently pumped out and hydrocarbon production is resumed. As the fracturing fluid encounters the porous reservoir formation a filtercake of solids from the fracturing fluid builds up on the surface of the rock constituting the formation. After fracturing has taken place a breaker (which is usually an oxidizing agent, an acid or an enzyme) may be introduced to break down this filter cake and/or to reduce the viscosity of the fluid in the fracture and allow it to be pumped out more effectively.

Tracers have been used in connection with hydraulic fracturing, mainly to provide information on the location and orientation of the fracture, as for instance in SPE 36675 and U.S. Pat. No. 3,987,850. U.S. Pat. No. 3,796,883 describes a further use of radio-active tracers to monitor the functioning of a well gravel pack.

It is known to associate tracers with a carrier material as particles from which the tracer is released after those particles are placed within a subterranean reservoir. For instance U.S. Pat. No. 6,723,683 uses starch particles as a carrier for a variety of oilfield chemicals including tracers. Association of a tracer substance with a carrier is also disclosed in U.S. Pat. Nos. 7,032,662 and 7,347,260.

U.S. Pat. No. 6,645,769 proposes that multiple tracers should be located at respective zones of a reservoir during completion of a well and also proposes that individual tracers should be associated with carrier particles from which the tracers are eventually released into the reservoir and hence into fluid produced from the well. This document teaches that placing of tracers at an individual location during completion of the well may be achieved by immobilization on a filter or casing before that filter or section of casing is inserted into the well.

SUMMARY OF THE INVENTION

The present invention utilizes a plurality of sets of tracer particles which each comprise a tracer substance and a carrier material. In contrast with prior disclosures of placing tracers at separate locations when first completing a wellbore, this invention can be applied when stimulating a wellbore which has already been in production. Broadly, this invention provides a process of making observations of a subterranean reservoir penetrated by a wellbore using multiple tracers provided as a plurality of sets of tracer particles, where the particles comprise a tracer substance and a carrier, but the sets of particles are distinguishable from each other in that they each comprise a distinctive tracer substance, for instance each set of tracer particles may comprise a tracer substance which is unique to that set. In the process of the invention, the sets of tracer particles are conveyed down the wellbore and selectively delivered to respective subterranean locations. Subsequently, when the tracer substances are released from the particles and detected in the fluid produced from the wellbore, the differences between the tracer substances makes it possible to recognize the subterranean location from which the detected tracer substance has come.

In a first aspect, this invention provides a process of making observations of a subterranean reservoir penetrated by a wellbore, using distinguishable sets of tracer particles, comprising steps of
  delivering a plurality of sets of tracer particles to respective subterranean locations via the wellbore, the particles in each set comprising a tracer substance which distinguishes that set form the other sets and also comprising a carrier;
  causing or allowing release of the tracer substances from the tracer particles whilst the particles are at the respective subterranean locations;
  causing or allowing production of fluid out of said reservoir via the wellbore; and
  detecting the presence or absence of the tracer substances in the produced fluid.

In the simplest arrangement, the plurality of tracer particles will be provided by a first set of tracer particles, conveyed down the well bore from the surface to a first subterranean location, said particles comprising a carrier and a first tracer substance; and
  a second set of tracer particles, conveyed down the well bore from the surface to a second subterranean location, said second particles comprising a carrier and a second tracer substance, where the second tracer substance is different from the first tracer substance, and the second location is different from the first location.

However, the number of sets of particles may be greater than two. Thus there may be one or more further sets of particles including at least a third set of tracer particles, conveyed down the well bore from the surface to a third subterranean location, said third particles comprising a carrier and a third tracer substance, where the third tracer substance is different from the first and second tracer substances, and the third location is different from the first and second locations. The tracer substances should be sufficiently distinguishable from each other to enable a tracer substance detected in the produced fluid to identify the set of tracer particles from which it has come. Preferably, each set of particles has a tracer substance which is distinctive to that set.

Selective delivery of sets of tracer particles to different subterranean locations may take a number of forms. One possibility is to add the sets of tracer particles successively to fluid which is being conveyed down the wellbore, foreseeing that the carrier fluid sent down the wellbore at later stages of a procedure will tend go to different subterranean destinations than fluid sent down the wellbore earlier.

However, some forms of this invention use the size of tracer particles to control where they are placed after they are transported down a wellbore. Then the first and second sets of particles (and possibly any further sets of tracer particles) differ from each other in particle size as well as in the tracer substances in the sets of particles.

In some embodiments the particles of one set (which may be designated as the first set of particles) are small enough to enter the pores of the rock which constitutes the reservoir formation itself. Another set of particles (which may be designated as the second set) have a larger particle size so that they are too large to enter the pores of the reservoir formation. Thus the first set of particles is placed selectively within rock pores while the second set is placed within larger pathways which extend within the reservoir (or at least within the near wellbore region).

There are many ways in which to use this invention in the investigation of subterranean reservoirs and in the monitoring of events which take place in such reservoirs. The invention is useful in particular in connection with hydraulic fracturing. Transport of particles down the wellbore may be carried out in the course of a fracturing job and the fluid(s) in which the tracer particles are conveyed down the wellbore may be fluid (s) used in the course of that fracturing job.

A possibility within this invention is to place a set of tracer particles in each hydraulic fracture when making a sequence of hydraulic fractures spaced along the length of a wellbore. As fluid is pumped down the wellbore to make each fracture, a set of particles is mixed with the fluid so as to be conveyed into the fracture concerned. Later, when the well is in production, the presence of all the tracers in the produced fluid would demonstrate outflow through every fracture whereas the presence of some of the tracers in the produced fluid and the absence of other tracers will show that there is flow from only some fractures and identify which ones.

Another possibility within this invention is to deliver a plurality of sets of tracer particles to different locations within a single fracture. This may be done with a first set of particles chosen to be small enough to enter rock pores, while a second set of particles is chosen to have a particle size which is too large to do so. The particle size of the second set of particles may then be chosen such that these particles become embedded in the filter cake which builds up on the surface of the rock constituting the subterranean reservoir formation. A third set of particles may have a particle size such that these particles are retained within the proppant as the proppant is packed into the fracture which has been created in the reservoir formation.

The first and second sets of particles may be mixed into fracturing fluid which is pumped down the wellbore before any proppant is used. A third set of particles, dimensioned to be retained within the proppant pack, may then be mixed with the fluid which is used to carry the proppant into the fracture. An alternative approach is to choose the particle size of the second set of particles so that these will pass through the packed proppant yet be retained in the filtercake. Then the first, second and third sets of particles can all be mixed with the fluid used to carry the proppant into the fracture (thus being delivered down the wellbore concurrently with proppant).

The above possibilities may be used together, conveying more than one set of particles into each fracture, when making a succession of fractures along the length of a single well.

The invention may also be utilized in conjunction with other well treatments in which a fluid is pumped down a wellbore and into the formation. One set of tracer particles could for example be incorporated into a diverter pill pumped into the wellbore ahead of the fracturing or treatment fluid. If a reservoir is naturally fractured, one set of particles might be dimensioned to enter rock pores while another set of particles does not do so and remains within the naturally occurring fractures.

In some forms of this invention a plurality of sets of tracer particles could be used in remedial treatments, when sealing leaks, cracks or voids, or when setting temporary plugs. A set of particles encapsulating a distinctive tracer substance would be used for each step, so that any location where the remedial treatment fails would be detected and identified by the release of the associated tracer. A plurality of sets of tracer particles could also be used when consolidating different formations with several stages of fluid. Release of a distinctive tracer substance would be useful to identify the location of a failure of the consolidation treatment.

Significant size properties for a set of particles are the particle size and the particle size distribution. Discussion of methods of measuring particle size and definitions of different averages of particle size can be found in a technical paper entitled "Basic Principles of Particle Size Analysis" by Alan Rawle of Malvern Instruments Ltd, Malvern, United Kingdom.

A relevant textbook is "Particle Size Measurement" by Terence Allen (4th ed, published by Chapman and Hall, London, 1990). Instrumentation for determining particle size by the commonly used technique of low angle laser light scattering, more commonly known as laser diffraction, is available from a number of suppliers including Malvern Instruments Ltd. The Malvern Mastersizer is a well known instrument which determines the volumes of individual particles, from which average particle size can be calculated according to several definitions, using computer software which accompanies the instrument.

The size of an individual particle is taken as the diameter of a spherical particle of the same volume, the so-called "equivalent sphere". The software associated with the instrument enables determination of volume median diameter denoted as $D[v,05]$ or $d_{50}$. This is a value of particle size such that 50% (by volume) of the particles have a volume larger than the volume of a sphere of diameter $d_{50}$ and 50% of the particles have a volume smaller than the volume of a sphere of diameter $d_{50}$.

Particle size distribution is conveniently indicated by the values of $d_{10}$ and $d_{90}$ measured by the same instrument. 10% by volume of the particles in a sample have an equivalent diameter smaller than $d_{10}$. 90% by number are smaller than $d_{90}$ and so 10% by volume are larger than $d_{90}$. The closer together the values of $d_{10}$ and $d_{90}$, the narrower is the particle size distribution.

Although particle size may be used to control where particles are placed, it may not be essential to achieve absolute separation between particles from different sets when placed in the subterranean reservoir. Consequently, although the sets of particles are distinguished by different median particle sizes, it is possible that there will be some overlap between their particle size distributions.

When a set of particles is intended to enter rock pores, the size of the particles should be chosen in relation to the pore size of the rock concerned but it will generally be the case that a set of particles intended to enter the pores in rock should generally have a median particle size less than 10 micron, better less than 5 micron and possibly much less than this. So, a first set of particles may have a $d_{50}$ median particle size which is not greater than 5 micron and a $d_{90}$ which is not greater than 20 micron and possibly not greater than 10 micron. A second set of particles intended to be retained as part of the filter cake may have $d_{50}$ above 10 micron, possibly above 15 or 20 micron, with $d_{10}$ of 3 microns or above, possibly 5 microns or above. If this set of particles is intended to pass through a proppant pack, it should have a median particle size which is considerably smaller than the median particle size of the proppant. For this, it may have a $d_{50}$ median particle size in a range from 10 microns up to 100 or 150 microns and may have $d_{90}$ no greater than 300 micron, possibly no greater than 250 or 200 micron. A third set of particles intended to be retained within proppant when it is packed within a fracture should desirably have median particle size similar to the proppant. Both the proppant and the third set of particles may have median particle size above 200 micron, preferably above 250 or 300 micron and both may have a $d_{10}$ value which is not less than 20 or 30 micron. Summarizing these preferred values in table form:

| Particle set | $d_{10}$ | Median size $d_{50}$ | $d_{90}$ |
| --- | --- | --- | --- |
| First, enters pores | | ≤10 micron possibly ≤5 micron | ≤20 micron possibly ≤10 micron |
| Second, retained by filter cake | ≥5 micron | ≥10 micron possibly ≥15 or 20 micron ≤150 micron possibly ≤100 micron | ≤300 micron possibly ≤250 or 200 micron |
| Third, retained by proppant | ≥20 micron possibly ≥30 micron | ≥200 micron possibly ≥250 or 300 micron | |

The shape of the particles may vary considerably. They may be approximately spherical, but it is also possible that they could be elongate and indeed could take the form of fibres of a carrier matrix material with the tracer substance distributed within such fibres.

The tracer substances which are incorporated into the tracer particles may be any of the substances which are known to be useful as tracers. Radio-isotopes may be used, and when detected in produced fluid they may be distinguished from each other by characteristics of the emitted radiation. For instance the tracer substance in one set of particles could be a beta-emitter while the tracer substance in another set could be an alpha-emitter, a gamma emitter or another beta emitter with a different energy of the emitted particles.

Another possibility is that the tracer substances in the particles could be biological tags comprising genetically coded DNA, which could be detected in the produced fluid by means of real-time PCR as described in WO2007/132137 incorporated herein by reference. A further possibility is that the tracers may be chemicals which can be detected using spectroscopic analytical methods such as UV-visible, fluorescence or phosphorescence, or may be chemicals with distinctive features which enable them to be distinguished by other analytical techniques such as GC-MS.

Chemicals which may be used as tracers may include various dyes and fluorescent materials, some examples being:

3,6-Bis(dimethylamino)acridine hydrochloride aka Acridine Orange (CAS Registry
No. 65-61-2); 2-anthracenesulfonic acid, sodium salt (CAS Registry No 130-22-3); Anthrasol Green IBA (CAS Registry No. 2538-84-3, aka Solubilized Vat Dye); bathophenanthrolinedisulfonic acid disodium salt (CAS Registry No. 52746-49-3); amino 2,5-benzene disulfonic acid (CAS Registry No 98-44-2); Celestine Blue (CAS Registry No. 1562-90-9); 1-ethylquinaldinium iodide (CAS Registry No. 606-53-3); fluorescein
(CAS Registry No. 2321-07-5); Keyfluor White ST (CAS Registry No. 144470-48-4); Lucigenin (CAS Registry No. 2315-97-1) aka bis-N-methylacridinium nitrate; 2,6-naphthalenedicarboxylic acid, dipotassium salt; mono-, di-, or tri-sulfonated napthalenes including 1,5-naphthalenedisulfonic acid, disodium salt (CAS Registry No. 1655-29-4);
4-amino-3-hydroxy-1-naphthalenesulfonic acid; 6-amino-4-hydroxy-2-naphthalenesulfonic acid and 1-amino-7-naphthalene sulfonic acid; Phorwite BKL (CAS Registry No. 61968-72-7); pyranine, (CAS Registry No. 6358-69-6) aka 8-hydroxy-1,3,6-pyrenetrisulfonic acid, trisodium salt; quinoline (CAS Registry No. 91-22-5); Rhodalux (CAS Registry No. 550-82-3); Rhodamine WT (CAS Registry No. 37299-86-8);
Safranine O (CAS Registry No. 477-73-6); Disodium 4,4-bis ((6-anilino-4-((2-hydroxypropyl)amino)-1,3,5-triazin-2-yl)amino)stilbene-2,2-disulphonate (CAS Registry No. 32694-95-4); Sulforhodamine B (CAS Registry No. 3520-42-1) aka Acid Red 52; Tinopal 5BM-GX (CAS Registry No. 169762-28-1); Tinopal CBS-X (CAS Registry No. 27344-41-8); and Thiazol Yellow (CAS Registry No. 1829-00-1).

Other chemical tracers include fluorine substituted compounds which may be fluorinated benzoic acids including 2-fluorobenzoic acid; 3-fluorobenzoic acid; 4-fluorobenzoic acid;
3,5-difluorobenzoic acid; 3,4-difluorobenzoic acid; 2,6-difluorobenzoic acid;
2,5-difluorobenzoic acid; 2,3-difluorobenzoic acid; 2,4-difluorobenzoic acid; pentafluorobenzoic acid; 2,3,4,5-tetrafluorobenzoic acid; 4-(trifluoro-methyl)benzoic acid;
2-(trifluoromethyl)benzoic acid; 3-(trifluoro-methyl)benzoic acid; 3,4,5-trifluorobenzoic acid; 2,4,5-trifluorobenzoic acid; 2,3,4-trifluorobenzoic acid; 2,3,5-trifluorobenzoic acid;
2,3,6-trifluorobenzoic acid; 2,4,6-trifluorobenzoic acid. Some other fluorine containing compounds which may be used are perfluoromethylcyclopentane (PMCP), perfluoromethylcyclohexane (PMCH), perfluorodimethylcyclobutane (PDMCB), m-perfluorodimethylcyclohexane (m-PDMCH), o-perfluorodimethylcyclohexane (o-PDMCH),
p-Perfluorodimethylcyclohexane (p-PDMCH), perfluorotrimethylcyclohexane (PTMCH), perfluoroethylcyclohexane (PECH) and perfluoroisopropylcyclohexane (IPPCH).

Salts which are not normally found in subterranean reservoirs, notably iodides and thiocyanates, may be used as tracers.

Another category of compounds which have been used as tracers are compounds of rare earth elements, in particular lanthanides. These are useful because they have distinctive spectra and can be detected by luminescence, possibly induced by irradiation with x-rays.

In order that tracer can be reliably carried to the surface in produced fluid, it may be preferred that the tracer dissolves in the produced fluid. However, it is possible that an insoluble tracer of small particle size, possibly even of nanoparticle size, could be utilized.

Putting tracer particles at locations in a reservoir formation and then examining produced fluid for the presence or absence of the tracer substances is done to collect information about flow from the locations concerned. However, the type of flow which is expected (or feared) will affect the circumstances in which a tracer substance is intended to be released from particles and the rate at which release occurs. For example, if the intention is to detect flow of oil from individual fractures it will be desirable to use tracer particles which slowly release an oil-soluble tracer at the reservoir temperature. If the intention is to detect the presence of water in the flow from a fracture, it will be desirable to use tracer particles which release water-soluble tracer into an aqueous phase. It will probably be desirable that slow release of the tracer takes place over a period of time, so that tracer in the produced fluid will demonstrate that water has flowed for a period of time.

In other circumstances it might be desired to demonstrate an event by means of tracer particles which release their tracer substance over a fairly short period. For instance, if tracer particles embedded in filter cake at the periphery of a fracture release tracer over a rather short period of time, the transient presence of the tracer in produced fluid would indicate that some fluid from the formation had passed through the filter-cake into the fracture.

In general it will be desirable that release of tracer does not occur during dry storage at ambient temperature and it will also be desirable that release of tracer does not become significant until the tracer particles have reached the subterranean location at which it is intended to place them.

The circumstances in which tracer is released from particles and the rate of release can be controlled by choice of the tracer material, notably its solubilities in water and oil, the nature and properties of the carrier material and the "architecture" of the particles including the manner in which the tracer is incorporated. This may take several forms. One possibility is that the tracer substance is adsorbed onto particles of carrier material (which may be a porous carrier material). When such particles are exposed to a fluid, the tracer substance will de-sorb from the particles over a period of time. It can be expected that some tracer substance will be released while the particles are being transported down the wellbore, but provided the de-sorption is sufficiently slow, most release of tracer substance will occur after the particles have reached their intended subterranean destination. U.S. Pat. No. 6,723,683 describes the preparation of particles of this type, using granular starch as the carrier material, for a range of oilfield chemicals. This document also mentions that the particle size may be controlled by milling to a desired size after the oilfield chemical has been adsorbed onto the starch particles.

Another possibility is disclosed in U.S. Pat. No. 6,645,769 which teaches that particles may consist of polymeric carrier material with tracer substance chemically bound to this polymer. Covalent bonds which attach the tracer to the polymer, or covalent bonds within the polymer chain are chosen so as to be chemically degradable under conditions encountered in the subterranean reservoir. Consequently, once the tracer substance is exposed to reservoir fluid, chemical reaction at these bonds releases that tracer from the polymeric carrier material or else releases tracer molecules attached to fragments of the carrier polymer.

A preferred form of particles, however, has tracer substance encapsulated by a carrier material. This encapsulating carrier material will usually be polymeric. Under conditions at the surface the tracer substance remains trapped within the enclosing polymer but within the reservoir a difference in the surrounding conditions liberates the tracer substance.

A number of technologies are known for the encapsulation of one material within another material. Polymeric materials have frequently been used as the encapsulating carrier. Some examples of documents which describe encapsulation procedures are U.S. Pat. No. 4,986,354, WO 93/22537, and WO 03/106809.

Encapsulation of one material within another, in the present case encapsulation of a tracer substance within a carrier, can lead to particles in which the tracer substance is distributed within a particle of the carrier substance, for instance as a plurality of small islands of the tracer substance surrounded by a continuous matrix of the carrier material. Alternatively encapsulation can lead to core-shell type particles in which a core of the tracer substance is encapsulated within a shell of the carrier material.

Core-shell type particles can release the encapsulated tracer substance all at once if the shell is broken, either mechanically or by chemical degradation. Islands-in-matrix type particles can release the islands of tracer substance upon chemical degradation of the matrix. We have found that both types of particles can release the encapsulated tracer substance over a period of time if the capsule material becomes permeable and allows the encapsulated material to diffuse through it to the particles' exterior surface. Both core-shell and islands-in-matrix type particles may be used in this invention. A number of materials may be used as carriers including some inorganic materials. A tracer substance might be enclosed within precipitated silica, for instance. However, a number of possible carrier materials are organic polymers.

Progressive release of a tracer substance over time may be brought about by means of a carrier material which dissolves slowly or undergoes chemical degradation under conditions encountered in the subterranean reservoir, thereby making the encapsulating material permeable to the tracer substance and/or leading to rupture of the shell of core-shell type particles.

An organic polymer which undergoes chemical degradation may have a polymer chain which incorporates chemical bonds which are labile to reaction, especially hydrolysis, under reservoir conditions leading to cleavage of the polymer chain. A number of chemical groups have been proposed as providing bonds which can be broken, including ester, acetal, sulfide and amide groups. Polymers incorporating such groups include poly(hydroxyacids), polyesters, polypeptides, polyesteramides and polysulfides. Cleavable groups which are particularly envisaged are ester and amide groups both of which provide bonds which can be broken by a hydrolysis reaction.

Generally, the rate of cleavage in aqueous solution is dependent upon the pH of the solution and its temperature. The hydrolysis rate of an ester group normally attains a maximum under high pH (alkaline) conditions. Conversely for an amide group, the decomposition rate is at a maximum under low pH (acidic) conditions. Low pH, that is to say acidic, conditions can also be used to cleave acetal groups.

Thus, choice of encapsulating polymer in relation to the pH which will be encountered after the particles have been placed at the intended subterranean location may provide a control over the delay before tracer substance is released from the particles.

Another possibility is that a polymer containing hydrolytically cleavable bonds may be a block copolymer with the blocks joined through ester or amide bonds. Copolymers which contain blocks joined by ester linkages can be prepared by reaction of a pre-polymer with hydroxy groups and a second pre-polymer containing groups which are able to react with hydroxy groups, notably carboxylic anhydride, acyl halide, ketene, ester, sulfonic acid, or sulfonyl halide.

One or both of the pre-polymers may itself be a polymer or oligomer. Prepolymers with reactive hydroxyl groups include oligosaccharides, synthetic polymers containing primary and secondary hydroxyl groups, such as poly(vinyl alcohol) and poly(hydroxy alkyl(meth)acrylate) copolymers, poly(siloxanes), epoxy resins, dihydroxy-terminated poly(amides), dihydroxy-terminated poly(amines),and dihydroxy-terminated poly(carbonates).

Block copolymers in which the blocks are joined through amide linkages can be prepared from pre- polymers containing amino groups. Examples of such pre-polymers include synthetic polymers that contain reactable primary amine groups, such as aminated polyacrylamide and diamino-terminated poly(amines) and poly(amides).

Examples of monomers or polymers containing groups that can be used to react with the hydroxyl-containing materials listed above to yield degradable ester links between polymer blocks or to react with the amino-containing groups listed above to yield degradable amide links include: aliphatic or aromatic polybasic acids, amides, acid anhydrides such as poly(maleic anhydride) and copolymers; polybasic acid alkyl esters, polybasic acid halides, imides, bisimides; and polysulphonic acids such as poly(styrenesulphonic acid).

Another possibility is that release can be induced by temperature at the subterranean location. We have found that some polymers provide negligible release at ambient temperature, but more rapid release at a higher temperature. We attribute this to an increase in permeability of the polymer when the temperature is raised above the glass transition temperature of the polymer. To employ this mechanism of release of encapsulated tracer substance, an encapsulating carrier polymer is chosen to have a glass transition temperature Tg which is above ambient but below the temperature encountered at the subterranean location. This has the consequence that the encapsulating polymer becomes permeable after the particles have been placed at the subterranean location. Tracer substance is released by diffusion through the encapsulating polymer.

Glass transition temperature $T_g$ is a characteristic of amorphous materials. Many polymers have a solid appearance at ambient temperature, but are in fact wholly or partially in an amorphous glassy state. A glass is a liquid which is under-cooled (sometimes termed supercooled) significantly below its true melting point and which has an extremely high viscosity. In a glass, diffusive processes other than the movement of some very small molecules, take place at extremely low rates, such as microns per year.

Above a temperature known as the glass transition temperature Tg, the viscosity drops rapidly and the glass turns into a rubber, then as temperature increases further it turns into a deformable plastic which at even higher temperatures turns into a fluid. Tg is a parameter which is used in many areas of science and industry. Tg values can be determined using a differential scanning calorimeter and can be detected as a point at which a plot of heat input against temperature passes through an inflection point, thus giving a maximum of the first temperature derivative. When measuring Tg it is desirable to operate the differential scanning calorimeter at a temperature ramp rate between 5 and 10° C. per minute.

We have found that an encapsulating matrix becomes permeable when the particle is heated above Tg of the matrix. So if the particles are below Tg at the surface but become heated above Tg after they have been placed in the subterranean fracture, the matrix is effective to enclose the oilfield chemical while the particles are at the surface, but then within the fracture the particles become permeable and allow the encapsulated oilfield chemical to escape into to the surrounding fluid. The release of the encapsulated chemical will take place by a process of diffusion through the matrix of carrier material which may remain intact. In order to have a Tg above ambient surface temperature, the matrix may have a Tg above 30° C. and possibly above 35 or 40° C.

During transit to the reservoir, the fracturing fluid will pass through a wellbore exposed to subterranean temperatures and will begin to heat up, but flow rates during fracturing are generally sufficiently high that fluid is still well below the reservoir temperature when it enters the fracture.

If particles are exposed to a prevailing temperature which is not much above Tg of the polymer, such as between 5 and 20° C. above Tg, the tracer substance diffuses slowly out of the particle providing controlled release of tracer over a period of time. By contrast if the prevailing temperature is well above Tg, the tracer is released much more quickly: for example, a high percentage of the tracer might be released over as short a time as two hours.

If the encapsulating polymer incorporates hydrolysable or otherwise degradable bonds and also has a Tg below the reservoir temperature, it is possible that both of the above mechanisms of tracer release will play a role, so that encapsulated tracer substance is released in part by diffusion out of the particle concurrently with release as a result of degradation of the particle. However, it is also possible that one mechanism of release will be faster than the other. For instance it is possible that release in response to temperature will be quicker than any effect of hydrolytic degradation so that the encapsulated tracer substance is released by diffusion while the particles remain substantially intact.

The "architecture" of tracer particles may be further elaborated in order to give the desired release profile. For example, particles which consist of small islands of the tracer within a continuous carrier matrix could be over-coated with a further material which is soluble in oil but not in water. This would prevent any tracer release while the particles were suspended in an aqueous fracturing fluid but the coating would dissolve, allowing the release of tracer to begin, at the start of oil production through the fracture.

Although the release of encapsulated tracer substance may be predicted, such as by reference to Tg, the tracer release profile of particles can also be observed in laboratory experiments before the particles are used. Such experiments involve exposing a sample quantity of the particles to conditions of pH and temperature which match those found in the subterranean location and monitoring release of tracer substance over time.

In some forms of this invention, a set of particles intended to be selectively placed at a subterranean location consist of a plurality of subsets. The particles of the two subsets will be similar in size, so that they go to the same location, but they differ both in their release profiles and in the tracer substances which they contain.

We have found that tracer substances can be successfully encapsulated by processes which involve encapsulation of solvent from an emulsified phase. Moreover, such processes are repeatable from batch to batch, allow the size of particles to be controlled and give an acceptably narrow distribution of particle size.

Hydrophobic tracer substances, soluble in organic solvent, can be encapsulated within a polymer using a technique comprising steps of (i) dissolving the tracer substance and encapsulating polymer in a water-immiscible organic solvent,
(ii) dispersing the resulting solution in an aqueous phase to form an oil-in-water emulsion in which the disperse phase is the solution formed in step (i),
(iii) stirring or otherwise agitating that emulsion while causing or allowing evaporation of the organic solvent, thereby forming tracer particles in which the tracer substance is enclosed by the polymer.

Hydrophilic, water-soluble tracer substances can be encapsulated by a double emulsion technique. This comprises steps of
(i) dissolving the tracer substance in water,
(ii) dissolving the encapsulating polymer in a water-immiscible organic solvent,
(iii) dispersing the aqueous solution of tracer substance in the solvent solution of polymer to form a water-in-oil emulsion,
(iv) dispersing this emulsion in water to form a water-in-oil-in-water double emulsion, and
(v) stirring or otherwise agitating that emulsion while causing or allowing evaporation of the organic solvent, thereby forming tracer particles in which the tracer substance is enclosed within a shell of the polymer.

A tracer which is an insoluble solid in powder form can be encapsulated in an analogous way by
(i) dissolving the encapsulating polymer in organic solvent,
(ii) suspending the tracer powder in the solvent solution of polymer in organic solvent,
(iii) dispersing the resulting suspension in water, to form an emulsion in which the disperse phase is droplets of the organic solvent with tracer powder suspended within these droplets, and
(iv) stirring or otherwise agitating that emulsion while causing or allowing evaporation of the organic solvent, thereby forming tracer particles in which the tracer substance is enclosed within a shell of the polymer.

In each of these procedures the particle size is affected by the choice of encapsulating polymer and the initial concentration of polymer in organic solvent, because these factors affect the viscosity of the disperse phase, from which organic solvent evaporates. A higher viscosity of this disperse phase leads to larger disperse droplets which in turn leads to larger particles. However, for any chosen composition, the droplet size of the disperse phase and hence the particle size of tracer particles can be controlled through the amount of shear applied to stir or agitate the emulsion while solvent evaporates. So, after choosing the encapsulating polymer and the other features of the composition, the significant parameters influencing particle size are the mixing condition and speed.

All the above procedures lead to an aqueous suspension of particles comprising tracer substance encapsulated with polymer. The particles can be recovered by filtration, washed, dried and stored until required for use.

Other manufacturing techniques are also available for the production of particles with an tracer substance encapsulated within a polymer matrix. One possibility is to mix the tracer substance into a melt of a polymeric carrier material and then form this melt into particles. This would be applicable in particular when the tracer substance was a solid powder. The powder would be mixed into a melt of the polymer matrix material which would then be extruded into fibres with the tracer substance distributed within those fibres. If less elongate particles were desired, the fibres could subsequently be chopped into short lengths. A related possibility would be to mix the tracer substance in powder form with the matrix polymer, also in powder form, and then heat the mixture until the matrix material melted to an extrudable condition.

Embodiments of this invention and features mentioned above will now be illustrated and exemplified by the examples below and by the drawings and description thereof.

DETAILED DESCRIPTION AND EXAMPLES OF PREPARATION

Figure 1:
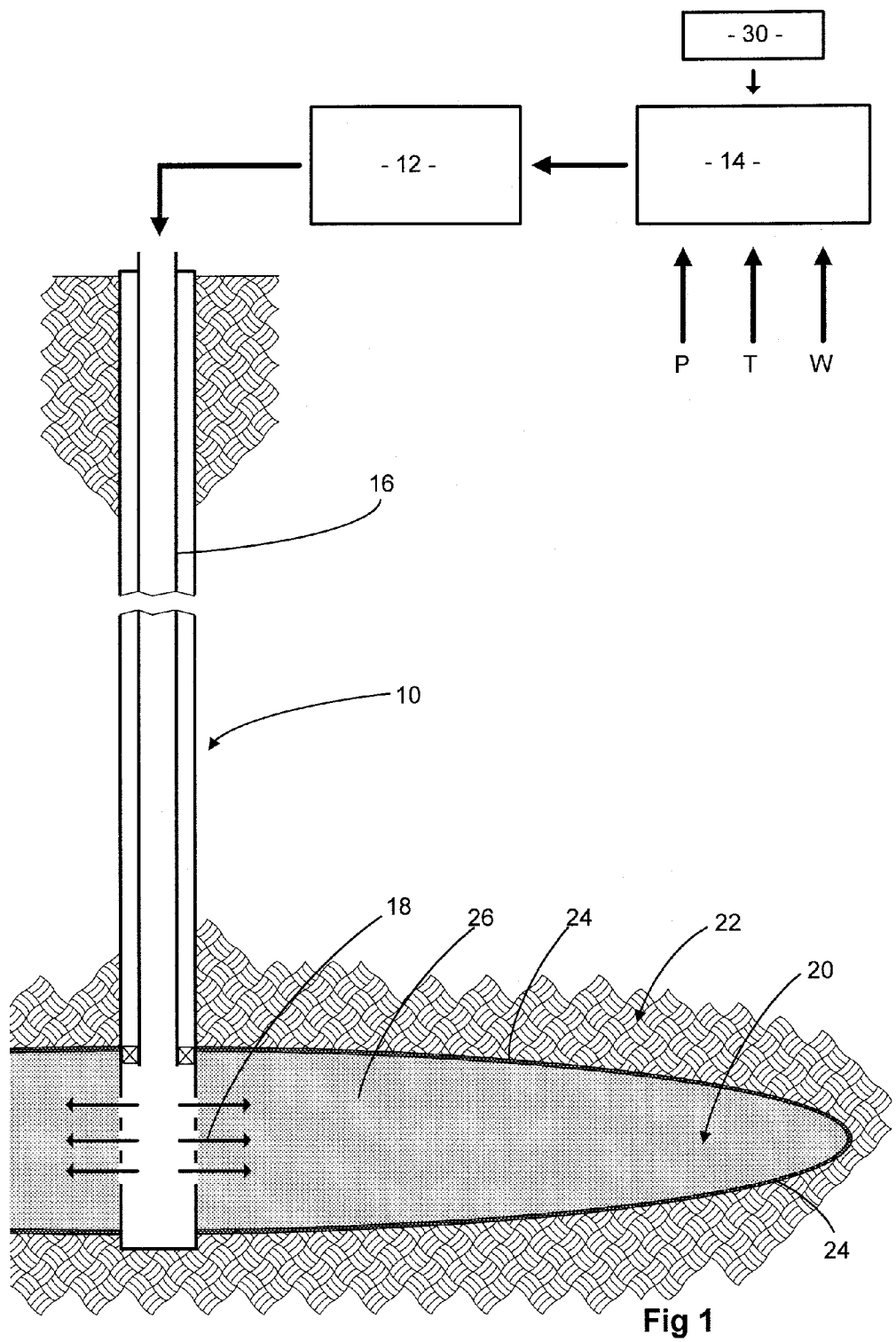
FIG. 1 diagrammatically illustrates mixing of particles into a fracturing fluid and pumping that fluid into a subterranean reservoir to form a fracture.

The following Examples 1 to 6 illustrate the preparation and properties of tracer particles.

Example 1

Encapsulation and Release of Hydrophobic Dye

Tracer particles were made using several encapsulating polymers and using a hydrophobic dye as the tracer substance. This dye was 2-[4-(diethylamino)phenylazo]benzoic acid, more usually known as ethyl red. The organic solvent which was used was dichloromethane ($CH_2Cl_2$). Polyvinyl alcohol (80% hydrolysed polyvinyl acetate) was used as an emulsifier.

Ethyl red (0.020 g) and encapsulating polymer (0.465 g) were dissolved in 10 ml dichloromethane. Polyvinyl alcohol (0.750 g) was dissolved in de-ionised water (150 g) using a mechanical stirrer (Heidolph RZ2050 electronic, 320 rpm) for about 30 min and the solution of dye and polymer in dichloromethane was then added to it, dropwise, to form an emulsion of the dichloromethane solution in the water. This emulsion was stirred at 320 rpm for 2 hours, the time for the dichloromethane solvent to evaporate. The resulting suspension of particles was then poured into 600 ml of de-ionised water and stirred for another 2 hours. The particles were then recovered by vacuum filtration on a cellulose nitrate membrane filter of 0.45 micron pore size and washed thoroughly with water until no coloration of the filtrate water was observed. The particles were then dried under vacuum and stored in a refrigerator.

Three encapsulating polymers used were Poly-L-lactic acid (PLLA), Poly-L/D-lactic acid (PLDLA) and Poly-L/D-lactide-co-glycolic acid (PLGA) (85:15 ratio) purchased from Sigma-Aldrich Chemicals. These all have relatively high molecular weight of about 100,000, and have fairly low glass transition temperatures (Tg) PLLA shows the highest glass transition at 51° C. as compared to 46° C. and 45° C. for PLDLA and PLGA, respectively. A fourth encapsulating polymer was a Poly-L/D-lactic acid (designated PLDLA#2) having a higher molecular weight of about 300,000 and a Tg of 60° C.

Particle size was determined using a Malvern Mastersizer. The size distribution was found to be narrow. The measured values (in micron) were

| Polymer | $d_{10}$ | $d_{50}$ | $d_{90}$ |
|---------|----------|----------|----------|
| PLLA    | 68.8     | 101.3    | 149.7    |
| PLDLA   | 58.8     | 86.8     | 127.4    |
| PGLA    | 81.6     | 112.8    | 155.4    |
| PLDLA#2 |          | 153.1    |          |

Scanning electron microscopy showed the particles to be spherical with a smooth surface and extraction of dye from a small sample of particles showed that the dye content was approximately 3.3-3.5% by weight.

The preparation above was repeated using the same materials and proportions but replacing the 320 rpm stirrer with a Silverson mixer running at 1500 rpm to give higher shear. Smaller particles resulted. Their measured particle size data was: $d_{10}$ 2 micron, $d_{50}$ 8 micron and $d_{90}$ 14 micron.

In order to study the release profiles of the particles at different temperatures, 10 mg sample quantities (made using the 320 rpm stirrer) were suspended in 10 ml de-ionized water (pH 7-8) and incubated in closed bottles at various temperatures. After a period of time the amount of dye already released into solution was determined by cooling the bottle and its contents to ambient temperature or below, to stop further release of dye, extracting the released dye with organic solvent, and examining the extract spectroscopically.

| Polymer | Test Temperature | 1 hr | 24 hr | 48 hr | 64 hr |
|---------|------------------|------|-------|-------|-------|
| PLLA    | 55° C.           | 0    | 0     | 0     | 0     |
| PLLA    | 65° C.           | 0    | 15%   | 21%   |       |
| PLLA    | 70° C.           | 0    | 21%   | 35%   | 42%   |
| PLLA    | 95° C.           | 40%  |       |       | 66%   |
| PLLA    | 120° C.          | 60%  | 80%   |       |       |
| PLDLA#2 | 65° C.           | 0    | 35%   |       |       |
| PLDLA#2 | 75° C.           | 12%  | 51%   |       |       |

Similar results were observed at lower temperature with PLDLA and PLGA

| Polymer | Test Temperature | 1 hr | 70 hr | 120 hr |
|---------|------------------|------|-------|--------|
| PLDLA   | 40° C.           | 0    | 0     | 0      |
| PLDLA   | 55° C.           | 0    | 45%   | 65%    |
| PLDLA   | 95° C.           | 45%  | 98%   |        |
| PLGA    | 40° C.           | 0    | 0     | 0      |
| PLGA    | 55° C.           | 0    | 45%   | 68%    |
| PLGA    | 95° C.           | 39%  | 90%   |        |

These results show a consistent pattern. For each polymer, if the temperature is slightly above Tg the dye was released progressively over time, but if the temperature was further above Tg the release was much more rapid, with a substantial proportion taking place within the first hour. The temperatures were higher for PLLA than for PLDLA and PLGA. This was attributed to partial crystallinity of the PLLA polymer, whereas the others were wholly amorphous.

An experiment was carried out to show that polymers of hydroxy acids degrade slowly in contact with water, with progressive loss of material from the particles. Particles were made by the procedure of Example 1, using two of the above polymers, but no dye was included. Particle sizes were measured and the $d_{50}$ median particle sizes were PLLA d50=106 micron
PLDLA#2 d50=149 micron.

For each polymer 20 mg samples of particles were placed in 20 ml de-ionized water and stored at 95° C. or at 120° C. in closed bottles, for various lengths of time. At the end of the storage time, the bottle was cooled in water at 0° C., and the solid was recovered by filtration, washed with de-ionized water on the filter and dried. The following results were obtained

| Storage at 120° C. Storage time (hours) | Weight lost (% of original weight) PLLA |
|------------------------------------------|-----------------------------------------|
| 10                                       | 15                                      |
| 24                                       | 35                                      |
| 48                                       | 75                                      |
| 60                                       | 97                                      |

| Storage at 95° C. | Weight lost (% of original weight) | |
|-------------------|-----|---------|
| Storage time (hours) | PLLA | PLDLA#2 |
| 50                | 5    | 25      |
| 75                | 14   |         |
| 190               | 37   | 60      |

Comparison with the results above for dye release at the same temperature shows that dye release by diffusion at temperatures above Tg proceeds faster than particle degradation.

Example 2

Encapsulation and Release of Hydrophobic Dye

The procedure of Example 1, using the 320 rpm stirrer, was repeated using polystyrene-co-maleic anhydride (PS-MA) and also using mixtures of PLLA and PS-MA in weight ratios of 95:5, 80:20, 50:50, 30:70. These polymer blends were made by simply dissolving both polymers, in chosen proportions, were both dissolved in the dichloromethane together with the ethyl red dye. The Tg values of these blends were not determined directly, but since PS-MA has a Tg of about 120° C. which is much higher than that of PLLA, the Tg of the blends would increase with increasing proportion of PS-MA.

Release profiles were studied as in Example 1, incubating the samples in closed bottles at 120° C., with the following results:

| Polymer | Test temperature | 1 hr | 5 hr | 10 hr |
|---------|------------------|------|------|-------|
| PS-MA alone | 120° C.      | 0    | 13%  | 21%   |
| 30% PLLA: 70% PS-MA | 120° C. | 15% | 21% | 30% |
| 50% PLLA: 50% PS-MA | 120° C. | 45% | 58% | 68% |
| 80% PLLA: 20% PS-MA | 120° C. | 50% | 68% | 72% |
| 95% PLLA: 5% PS-MA | 120° C.  | 61% | 72% | 80% |

It can be seen that the blends with 50% or more PLLA, which have lower Tg, display significant early release, whereas PS-MA alone and 30:70 PLLA:PS-MA give gradual release. It can also be seen that particles made from pure PS-MA showed a steady release at 120° C. after an initial delay: note that no release was observed after 1 hour. When release profiles were studied at 95° C. no release of ethyl red was observed after 15 hours for PS-MA microspheres, as well as PLLA microspheres containing 70 wt. % PSMA.

Example 3

Encapsulation and Release of Hydrophobic Dye

The particle preparation procedure of Example 1 was carried out, using the 320 rpm stirrer and PLLA as the polymer. The dye was 2-[4-(dimethylamino)phenylazo]benzoic acid, more usually known as methyl red which is a homologue of ethyl red. The encapsulated particles were found to have $d_{50}$ of 106 micron. As in Example 1, sample quantities were suspended in de-ionised water and stored in closed bottles. The storage times and temperatures were 2 days and 20 days at 50° C. and 60° C. The percentages of dye released are given in the table below. It can be seen that the release of dye took place over a number of days.

| Polymer | Test temperature | 2 days | 20 days |
|---------|------------------|--------|---------|
| PLLA    | 50° C.           | 2%     | 38%     |
| PLLA    | 60° C.           | 5%     | 75%     |

Example 4

Encapsulation and Release of Hydrophilic Dye

Tracer particles were made using either PLLA or PLDLA#2 as the encapsulating polymer and using a water soluble hydrophilic dye as the tracer substance. This dye was the sodium salt of 4-(4-diethylaminophenylazo)benzenesulfonic acid, more usually known as ethyl orange.

Polyvinyl alcohol (0.375 g) was dissolved in water (150 g) containing 3 wt % sodium chloride using a mechanical stirrer (Heidolph RZ2050 electronic, 320 rpm) for about 30 min. Encapsulating polymer (0.25 g) was dissolved in 3.7 ml dichloromethane and added to a solution of ethyl orange in water (0.20 ml). Various concentrations of ethyl orange in the water were used. The resulting mixture was stirred using a magnetic stirrer at its maximum rate for 10 min to form a water-in-oil emulsion which was then added dropwise to the saline solution of polyvinyl alcohol over about 3 hours to form a water-in-oil-in-water double emulsion. This double emulsion was then poured into 600 ml of water containing 3 wt % sodium chloride and stirred at 320 rpm for another hour. As the dichloromethane solvent evaporated, the dispersed droplets were converted to particles comprising ethyl orange encapsulated by polymer. The particles were recovered by vacuum filtration on a cellulose nitrate membrane filter of 0.45 micron pore size and washed three times with water. The particles were then dried under vacuum and stored in a refrigerator. Examination of particles under an optical microscope showed that each particle contained islands of the ethyl orange in a matrix of the encapsulating PLLA.

This preparation procedure was also carried out using a Silverson mixer at 800rpm in place of the 320rpm stirrer to provide greater shear while mixing. The polymers, dye content, mixing speed during preparation and median particle size of a number of samples are given in the following table

| Polymer  | Ethyl orange as wt % of polymer | Mixer speed | $d_{50}$ (micron) |
|----------|--------------------------------|-------------|--------|
| PLLA     | 11.3%                          | 320 rpm     | 201.9  |
| PLLA     | 7.7%                           | 320 rpm     | 201.1  |
| PLLA     | 4.78%                          | 320 rpm     | 168.3  |
| PLLA     | 4.86%                          | 800 rpm     | 50.5   |
| PLLA     | 2.42%                          | 800 rpm     | 46.4   |
| PLDLA#2  | 11.04%                         | 320 rpm     | 234.4  |
| PLDLA#2  | 6.5%                           | 320 rpm     | 190.8  |
| PLDLA#2  | 3.6%                           | 320 rpm     | 269.5  |
| PLDLA#2  | 1.8%                           | 800 rpm     | 68.4   |

The release profiles from some of the above particles were studied in the same way as in previous Examples. The following results were obtained:

| Polymer and wt % dye | $d_{50}$ (micron) | Test temperature | 1 hour | 19 hours | 40 hours | 110 hours |
|----------------------|-------------------|------------------|--------|----------|----------|-----------|
| PLLA 7.7%            | 201.1             | 75° C.           | 0      | 10%      | 15%      | 20%       |
| PLLA 7.7%            | 201.1             | 95° C.           | 0      | 38%      | 60%      | 100%      |
| PLLA 7.7%            | 201.1             | 120° C.          | 35%    | 100%     |          |           |
| PLDLA#2 6.5%         | 190.8             | 75° C.           | 25%    | 45%      | 50%      | 65%       |
| PLLA 4.78%           | 168.3             | 75° C.           | 3%     | 9%       | 11%      | 20%       |
| PLLA 4.86%           | 50.46             | 75° C.           | 20%    | Over 50% | 65%      | Over 70%  |

It can be observed that, as with encapsulated ethyl red in Example 1, the rate of release from PLLA particles was temperature dependent. Also, particles with PLDLA#2 polymer released dye more quickly than PLLA particles, consistent with the partially crystalline nature of PLLA. Thirdly, comparison of, PLLA particles with approximately 4.8% dye content showed that dye release from the smaller particles made at higher shear was much faster than from larger particles.

Example 5

Encapsulation and Release of Hydrophilic Dye

Further particles were made as in the preceding Example, above, using PLLA polymer, 7.7 wt % dye and stirring with the 320 rpm stirrer. The median size $d_{50}$ of these particles was found to be 317 microns. The release profiles from some of the above particles were studied in the same way as in previous Examples, with storage periods of 2 and 20 days The following results were obtained. It can be appreciated from these results that release of the encapsulated dye was taking place over a period of some days.

| Polymer | Test temperature | 2 days | 20 days |
|---------|------------------|--------|---------|
| PLLA    | 50° C.           | 5%     | 75%     |
| PLLA    | 60° C.           | 7%     | 75%     |

Example 6

Encapsulation of a Model Insoluble Solid

The production of tracer particles containing a solid phase tracer substance was modeled using PLLA as the encapsulating polymer and an inert solid powder (15 micron median particle size) as a model for a tracer substance.

Polyvinyl alcohol (1.5 g) was dissolved in water (600 g) containing 9 wt % sodium chloride using a mechanical stirrer (Heidolph RZ2050 electronic, 320 rpm) for about 30 min. PLLA (0.25 g) was dissolved in 7 ml dichloromethane to which solid powder, in an amount which was 9% by weight of the PLLA was then added. The resulting mixture was shaken vigorously to suspend the powder in the dichloromethane solution and added to the saline solution of polyvinyl alcohol. This was stirred for about 3 hours while dichloromethane solvent evaporated, after which the mixture was poured into 600 ml of water containing 9 wt % sodium chloride and stirred for another hour. The resulting PLLA particles containing encapsulated powder were recovered by vacuum filtration on a cellulose nitrate membrane filter of 0.45 micron pore size and washed three times with water. The particles were then dried under vacuum.

The procedure was repeated, with the same amount of PLLA dissolved in only 4 ml dichloromethane, thus providing a more viscous dichloromethane solution, which led to an increased particle size for the encapsulated particles.

Particle size measurements on the particles of encapsulated powder are given in the following table.

|  | Powder as wt % of PLLA | $d_{10}$ | $d_{50}$ | $d_{90}$ |
|---|---|---|---|---|
| PLLA in 7 ml $CH_2Cl_2$ | 6.43 | 47 | 90 | 190 |
| PLLA in 4 ml $CH_2Cl_2$ | 5.74 | 111 | 200 | 397 |

Example 7

Illustration of Multiple Tracers Delivered Concurrently

FIG. 1 shows diagrammatically the arrangement when a fracturing job is carried out. As is conventional for such a job, hydrocarbon production from an existing wellbore 10 is halted and the well head is coupled to pumps 12 supplied by a mixer 14. This mixer is supplied with thickening polymer, water and (when required) particulate proppant as indicated by arrows W, P and T. Viscous fracturing fluid formed by mixing in the mixer 14 is pumped down the production tubing 16 within the wellbore 10 and exits into the reservoir formation 22 as indicated by the arrows 18 at the foot of the well, at a pressure which is sufficiently great to initiate and propagate a fracture 20 in the formation 22 In the early stages of the fracturing job, the fluid does not contain proppant and elongates the fracture, but later on solid, particulate proppant is suspended in the fracturing fluid which is being pumped in. A standard proppant is used: sand having particle size ranging from 425 to 840 micron (20 to 40 US sieve). The fluid leaks off into the formation around the fracture, depositing a filtercake 24 of the thickener on the formation's surfaces exposed to the fracture 20 and packing the fracture with proppant 26 represented by a dot pattern. Pumping of fluid is stopped when the fracture has been formed and packed with proppant. The pressure in the fracture drops as fluid leaks off into the formation and the fracture closes on the proppant pack which remains sufficiently porous to provide a flow path along the fracture and out into the wellbore.

The fracturing fluid usually includes a "breaker" chemical or enzyme which (after a delay) reacts with the thickener in the fracturing fluid, converting it to reaction products which do not viscosify the fluid, thus reducing the viscosity of the aqueous fluid in the fracture and breaking down the filter-cake 32. The liquid part of the fracturing fluid is produced out of the wellbore as hydrocarbon production is resumed.

To implement the process of the invention, a metering device 30 is used to introduce three sets of tracer particles 32, 34 and 36 into the mixer 14 while fracturing fluid containing suspended proppant is being mixed and pumped in. These three sets of particles differ in size, in the tracer substances encapsulated within them and also differ in where they are placed in relation to the fracture.

Figure 2:
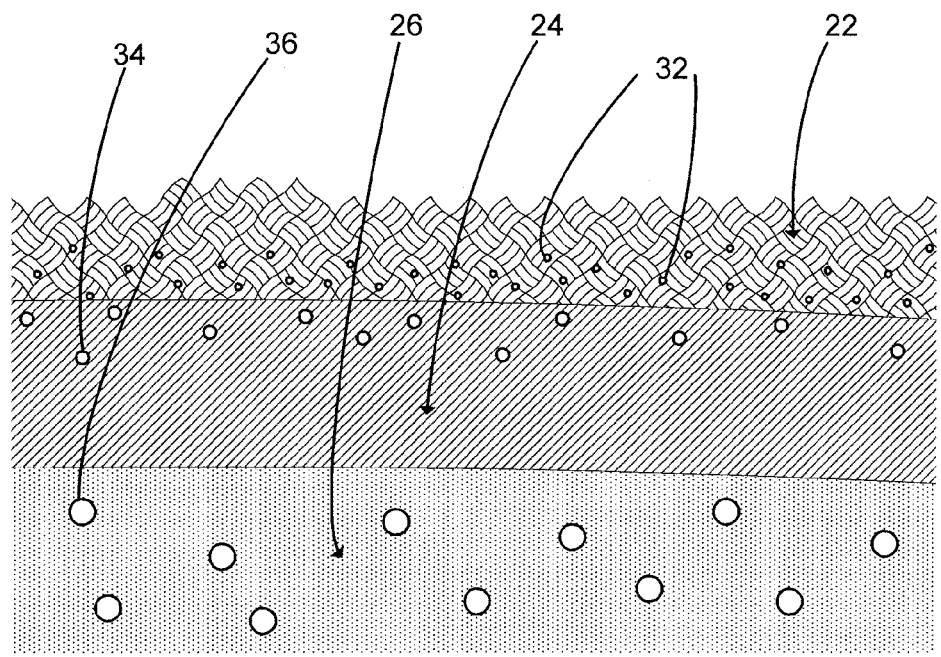
FIG. 2 is an enlarged cross sectional view through the edge region of a fracture.

In this illustration, the smallest particles 32 have a median particle size of 5 micron. This allows them to flow through the proppant in the fracture and through the filtercake 32 so that, as shown in the enlarged view in FIG. 2, the smallest particles 32 are carried into pores of the formation as fluid leaks into it from the fracture. These particles 32 contain a hydrophobic, oil-soluble dye C as tracer substance and the encapsulating polymer is chosen such that this dye C is released slowly, over a period of time at the reservoir temperature.

The intermediate sized particles 34 have a median particle size of about 30 microns. They are too large to enter formation pores but they can pass through the proppant pack and so they become trapped in the filter cake. These particles contain a water-soluble dye D as tracer substance and release it relatively rapidly at reservoir temperature.

The largest particles 36 have a median particle size of about 300 microns, large enough that they become trapped within the pack of proppant 26. These particles contain an oil-soluble dye E as tracer substance and this is also released slowly at the reservoir temperature.

When production is resumed, the tracer dye D liberated from the particles 34 is carried to the surface in the aqueous remains of the fracturing fluid. Detection of the dye D in samples of the aqueous phase produced from the wellbore confirms that the filtercake 24 has broken down allowing the liberated dye D to be swept out into the wellbore. The tracer dyes C and E are detected in samples of the resumed hydrocarbon flow and confirm that hydrocarbon containing tracer dye C is flowing out of the reservoir formation 22 into the fracture where it picks up some of tracer dye E as it flows through the proppant pack to the wellbore.

Example 8

Illustration of Tracers in Multiple Fractures

Figure 3:
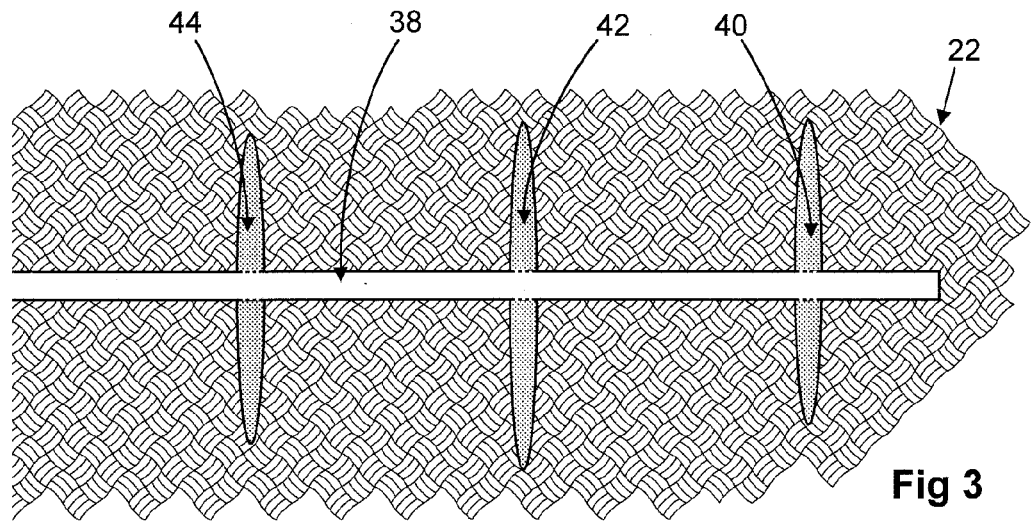
FIG. 3 diagrammatically illustrates a sequence of fractures in a subterranean reservoir.

FIG. 3 illustrates the formation of multiple fractures, (three are shown and designated 40, 42, 44) in a sequence spaced along a wellbore 38 which extends horizontally through a reservoir formation 22. The fractures are formed one at a time by pumping from the surface through equipment which allows the fluid to reach only one fracture position. The present invention could be implemented with such an arrangement by delivering three sets of particles of differing size to each fracture, similarly to the particles 32,34 and 36 shown in FIG. 2. It would preferably be arranged that the tracer substance encapsulated in each set of particles would be unique to that set. Consequently, the sets of particles delivered to one fracture, eg fracture 40 would differ from each other and would also differ from the tracer substances in the sets of particles delivered to the fractures 42, 44 and any other fractures. Of course, the total number of different sets of particles which are required would be three times the number of fractures. Detection of all of the tracers in fluid produced from the wellbore would confirm that the filtercake had broken down in each fracture and that there was hydrocarbon flow out through each fracture.

Another possibility might be to deliver only one unique set of particles to each fracture. These might for instance be particles which contain oil-soluble tracer substances and are dimensioned to be trapped in the proppant pack like the particles 36. When there is flow from the reservoir, the detection of tracer substance from each fracture would confirm that there is flow out of each fracture. It is also possible that such an arrangement could be used with a well which extended through multiple pay zones at different depths, with one or more fractures extending into each pay zone.

There are numerous other possibilities within the scope of this invention. A possibility is that different sets of particles, having similar size but different tracer substances are mixed into the fracturing fluid at different stages of of a fracturing job. Then a set of particles mixed in early on would be carried a long way into the fracture while a set of particles mixed in at a late stage would remain fairly near the wellbore. More specifically, one set of particles dimensioned to be retained in the proppant pack might be mixed with the first proppant to be pumped into a fracture and carried to the extremity of the fracture. A second set of particles of similar size might be mixed with the last part of the proppant to be pumped in. If both tracer substances are detected in subsequent hydrocarbon production, this will show that hydrocarbon is able to enter the tip of the fracture and flow along it as well as entering the fracture close to the wellbore.

Figure 4:
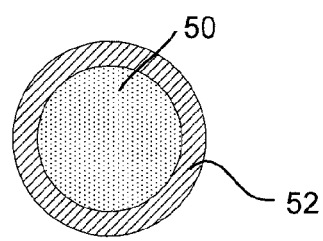
FIG. 4 is a cross section through a composite particle.

FIG. 4 illustrates a possible further development to the "architecture" of particles. A particle made by the procedure used for Examples 1 to 6 provides a core 50, which contains a tracer dye distributed within an encapsulating polymer matrix. This core 50 is overcoated with a shell 52 of an oil-soluble wax. When such a particle is suspended in an aqueous fracturing fluid no release of tracer dye can occur because the shell 52 provides a barrier surrounding the core. When the particle eventually comes into contact with oil below ground, this is able to dissolve the shell 52, allowing the slow release of dye from the core 50 to begin.

The invention claimed is:

1. A process of making observations of a subterranean reservoir penetrated by a wellbore, in the course of hydraulic fracturing of the subterranean reservoir, using tracer particles, comprising steps of
   transporting a plurality of sets of tracer particles concurrently down a wellbore and delivering the sets of particles to respective subterranean locations via the wellbore, the particles in each set comprising a tracer substance which distinguishes that set from the other sets and which is encapsulated by a carrier;
   at least two of the sets of particles differing in median particle size so as to be delivered to different subterranean locations;
   causing or allowing the tracer substances to flow out from the tracer particles whilst the particles are at the respective subterranean locations;
   causing or allowing production of fluid out of said reservoir via the wellbore to the surface; and
   detecting the presence or absence of the individual tracer substances in the fluid produced to the surface and distinguishing the detected tracer substances from each other to identify the subterranean location from which each detected tracer has come.

2. The process of claim 1 wherein the plurality of sets of tracer particles comprises at least three sets, which differ from each other in median particle size and are delivered to respective different subterranean locations.

3. The process of claim 1 wherein the particles of a first set are sufficiently small to enter pores of the rock which constitutes the subterranean reservoir formation but particles of another said set, distinguished from the first set by the tracer therein, are too large to do so.

4. The process of claim 3 wherein the first set of particles has a median particle size of no more than 10 microns.

5. The process of claim 4 wherein not more than 10 wt % of the particles of the first set have a particle size larger than 20 microns.

6. The process of claim 1 wherein a first set of particles has a median particle size of no more than 10 microns and a second set of particles has a median particle size in a range from 20 to 100 microns.

7. The process of claim 6 wherein not more than 10 wt % of the particles in the second set have a particle size smaller than 10 microns.

8. The process of claim 1 wherein a third set of particles differs in median particle size from the first and second sets of particles.

9. The process of claim 8 wherein the third set of particles has a median particle size of over 200 microns.

10. The process of claim 9 wherein not more than 10 wt % of the first particles have a particle size larger than 20 microns, not more than 10 wt % of the second particles have a particle size smaller than 15 microns, not more than 10 wt % of the second particles have a particle size larger than 200 microns and not more than 10 wt % of the third particles have a particle size smaller than 150 microns.

11. The process of claim 1 wherein proppant is transported down the wellbore and a plurality of sets of particles are transported down the wellbore concurrently with proppant.

12. The process of claim 1 wherein the carrier material comprises organic polymer and has a Tg value which is above ambient temperature at the surface but below the temperature at the subterranean locations to which the particles are delivered.

13. The process of claim 1 wherein the carrier material comprises organic polymer with hydrolysable groups in the polymer chain which are labile to hydrolysis to break the polymer chain.

14. A process of making observations of a subterranean reservoir penetrated by a wellbore, in the course of hydraulic fracturing of the subterranean reservoir, comprising steps of
   delivering a plurality of sets of tracer particles concurrently down a wellbore to respective subterranean locations via the wellbore, the particles in each set comprising a tracer substance which distinguishes that set from the other sets and which is encapsulated by a carrier material;
   the sets of tracer particles comprising a first said set wherein the particles enter pores of the rock which constitutes the subterranean reservoir formation, and a second said set distinguished from the first set by the tracer therein wherein the particles have a median size which is larger than the median particle size of the first set and do not enter pores of the reservoir formation;
   causing or allowing the tracer substances to flow out from the tracer particles whilst the particles are at the respective subterranean locations;
   causing or allowing production of fluid out of said reservoir via the wellbore to the surface; and
   detecting the presence or absence of the individual tracer substances in the fluid produced to the surface and distinguishing the detected tracer substances from each other to identify the subterranean location from which each detected tracer has come.

15. A process of making observations of a subterranean reservoir penetrated by a wellbore, in the course of hydraulic fracturing of the subterranean reservoir, comprising steps of
   delivering a plurality of sets of tracer particles concurrently down a wellbore to respective subterranean locations via the wellbore, the particles in each set comprising a tracer substance which distinguishes that set from the other sets and which is encapsulated by a carrier material;

the sets of tracer particles comprising one set wherein the particles have a median particle size no larger than 100 microns and another set wherein the particles have a median size which larger than 200 microns;

causing or allowing the tracer substances to flow out from the tracer particles whilst the particles are at the respective subterranean locations;

causing or allowing production of fluid out of said reservoir via the wellbore to the surface; and detecting the presence or absence of the individual tracer substances in the fluid produced to the surface and distinguishing the detected tracer substances from each other to identify the subterranean location from which each detected tracer has come.

16. A process according to claim 15 wherein there are at least three sets of tracer particles, the sets of tracer particles comprising a first set wherein the particles have a median particle size of no more than 10 microns and not more than 10 wt % of the particles of the first set have a particle size larger than 20microns;

a second set wherein the particles have a median particle size in a range from 20 to 100microns, not more than 10 wt % of the particles of the second set have a particle size smaller than 15 microns, and not more than 10 wt % of the particles of the second set have a particle size larger than 200 microns;

and a third set wherein the particles have a median size which larger than 200 microns and not more than 10 wt% of the particles of the third set have a particle size smaller than 150microns.

17. The process of claim 14 wherein not more than 10 wt % of the first particles have a particle size larger than 20 microns and not more than 10 wt % of the second particles have a particle size smaller than 15 microns.

18. The process of claim 17 wherein the sets of particles comprise a third set of particles which differs in tracer substance and median particle size from the first and second sets of particles and has a median particle size of over 200 microns.

19. The process of claim 18 wherein not more than 10 wt % of the second set of particles have a particle size larger than 200 microns and not more than 10 wt % of the third set of particles have a particle size smaller than 150 microns.

* * * * *